United States Patent
Wu et al.

(10) Patent No.: US 11,737,430 B2
(45) Date of Patent: Aug. 29, 2023

(54) METHOD FOR APPLYING AN AGROCHEMICAL TO AN AGRICULTURAL AREA OF INTEREST

(71) Applicant: BASF AGRO TRADEMARKS GMBH, Ludwigshafen am Rein (DE)

(72) Inventors: Tai-Teh Wu, Chapel Hill, NC (US); Dick Rogers, Chapel Hill, NC (US)

(73) Assignee: BASF AGRO TRADEMARKS GMBH, Ludwigshafen am Rein (DE)

(*) Notice: Subject to any disclaimer, the term of this patent is extended or adjusted under 35 U.S.C. 154(b) by 207 days.

(21) Appl. No.: 17/101,821

(22) Filed: Nov. 23, 2020

(65) Prior Publication Data
US 2021/0100221 A1    Apr. 8, 2021

Related U.S. Application Data

(63) Continuation of application No. 15/736,055, filed as application No. PCT/US2016/039267 on Jun. 24, 2016, now Pat. No. 10,842,131.

(60) Provisional application No. 62/183,800, filed on Jun. 24, 2015.

(51) Int. Cl.
| A01M 1/02 | (2006.01) |
| A01K 29/00 | (2006.01) |
| A01M 29/12 | (2011.01) |
| A01K 47/06 | (2006.01) |
| A01C 1/06 | (2006.01) |
| A01M 21/04 | (2006.01) |
| B64C 39/02 | (2023.01) |
| B64U 101/00 | (2023.01) |

(52) U.S. Cl.
CPC .............. *A01K 29/005* (2013.01); *A01C 1/06* (2013.01); *A01K 47/06* (2013.01); *A01M 1/026* (2013.01); *A01M 21/043* (2013.01); *A01M 29/12* (2013.01); *B64C 39/024* (2013.01); *A01M 2200/012* (2013.01); *B64U 2101/00* (2023.01)

(58) Field of Classification Search
CPC ........ A01M 1/026; A01M 99/00; A01K 51/00
See application file for complete search history.

(56) References Cited

U.S. PATENT DOCUMENTS

| 6,653,971 B1* | 11/2003 | Guice ................. A01M 1/026 342/28 |
| 6,853,328 B1 | 2/2005 | Guice et al. |
| 7,501,979 B1* | 3/2009 | Guice ................. A01M 1/226 235/404 |
| 7,511,624 B2 | 3/2009 | Shaw et al. |
| 9,295,245 B1* | 3/2016 | Guice ................. A01M 1/026 |
| 9,693,547 B1* | 7/2017 | Moitier ............... A01M 5/02 |
| 10,010,898 B2* | 7/2018 | Gasper ................ G01F 1/666 |
| 10,045,523 B2* | 8/2018 | Ehrlich ............... G06V 10/255 |
| 2010/0186284 A1* | 7/2010 | Hyde ................. A01M 1/226 43/132.1 |
| 2015/0208636 A1 | 7/2015 | David et al. |

FOREIGN PATENT DOCUMENTS

WO    WO-2004/010762 A2    2/2004

OTHER PUBLICATIONS

European Search Report for EP Patent Application No. 21205069.4, dated Feb. 15, 2022, 3 pages.

* cited by examiner

*Primary Examiner* — Kristen C Hayes
(74) *Attorney, Agent, or Firm* — Lowenstein Sandler LLP

(57) ABSTRACT

The present disclosure is directed to a method for applying an agrochemical to an agricultural area of interest based on information generated from a remote sensing survey. A remote sensing survey is performed within or adjacent to the agricultural area of interest wherein the survey generates remotely sensed data. The remotely sensed data can be analyzed and/or interpreted to determine whether to apply an agrochemical based on an insect presence within or adjacent to the agricultural area of interest.

15 Claims, No Drawings

METHOD FOR APPLYING AN AGROCHEMICAL TO AN AGRICULTURAL AREA OF INTEREST

RELATED APPLICATIONS

The present application is based on and claims priority to U.S. Provisional Patent Application Ser. No. 62/183,800, filed on Jun. 24, 2015, and which is incorporated herein by reference.

BACKGROUND

It is often desirable to study the activity of various insects, such as bees, for the purposes of crop management. For instance, it is well known that bees are capable of pollinating various crops. In fact, many agricultural products are dependent on bee, specifically honey bee, pollination. In this regard, it may be desirous to maintain a healthy bee colony within or adjacent to an agricultural area of interest for such purposes. Thus, while it may be necessary at times to apply certain agrochemicals, such as pesticides, fertilizers, and the like, to these areas, it is important that such applications minimally impact the health of these bee colonies. Thus, it may be desirous to study the activity of these bees in order to determine the ideal locations and times for applying such agrochemicals.

One conventional method of studying the activity and/or detecting the presence of insects, such as bees, within an agricultural area of interest is for an observer to physically traverse through the area of interest. Upon traversing the area, the observer can assess the activity and health of the insects, if any are in fact present. Based on such assessment, a determination can then be made as to whether to apply a certain agrochemical to the agricultural area of interest or whether to even apply an agrochemical at all. However, this method can require a substantial amount of time and effort, especially in an instance where there is a considerable area of interest and/or travel is necessary just to get to the area of interest.

In other situations, one may apply agrochemicals without gathering any information regarding the agricultural area of interest. For instance, the agrochemicals may be applied without having any knowledge of the particular insects that may be present within the area, much less any other knowledge about the area of interest. Thus, this method can result in unnecessary agrochemical applications, which may result in agro-ecological problems.

While the aforementioned methods may be simplistic and easy to implement, they are inefficient. As a result, there is a need for an improved method of assessing an agricultural area of interest and applying an agrochemical to such an area of interest.

SUMMARY

In general, the present disclosure is directed to a method for applying an agrochemical to an agricultural area of interest. The method comprises a step of performing a remote sensing survey within or adjacent to an agricultural area of interest wherein the remote sensing survey generates remotely sensed data. The method further comprises a step of analyzing the remotely sensed data to determine whether to apply an agrochemical based on an insect presence within or adjacent to the agricultural area of interest. The method further comprises a step of optionally applying an agrochemical within or adjacent to the agricultural area of interest.

Other features and aspects of the present disclosure are discussed in greater detail below.

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations.

In general, the present invention is directed to a method for applying an agrochemical to an agricultural area of interest. In particular, the method employs a remote sensing survey for surveying and/or studying a specific object of interest within or adjacent to the agricultural area of interest. Such surveying can be used to determine whether an agrochemical should be applied at that time or at some time in the future.

In general, the method includes performing a remote sensing survey of an agricultural area of interest. Upon conducting the survey, data in connection to the agricultural area of interest and/or an object of interest within or adjacent to the area of interest is generated. The remotely sensed data can be transmitted. The remotely sensed data can then be analyzed and/or reviewed. The data can provide information regarding the area of interest and/or the extent the object of interest is present within and/or adjacent to the area of interest. In this regard, the present invention is also directed to the production of information and/or data that is correlated to an agricultural area of interest and/or an object of interest within or adjacent to the area of interest.

Agricultural Area of Interest

As indicated herein, the remote sensing survey is performed within or adjacent to an agricultural area of interest. For instance, this area of interest may be an area upon which it is desired to apply an agrochemical. In one particular embodiment, the area of interest may be an agricultural field, such as a field upon which a crop has been and/or may be planted. When the area of interest is a field, the boundaries of the field may be specified in terms of latitude and longitude coordinates. Alternatively, the area of interest may be specified using maps with identifying landmarks and geographical information.

When referring to an agricultural field for crops, the crops are not limited to any certain crops. The crops include, but are not limited to, corn, cotton, sorghum, soybean, sugarbeet, potato, oat, rye, barley, rice, canola, wheat, and vegetable. Crops may also include genetically modified crops or plants. Genetically modified plants (or transgenic plants) are plants of which a heterologous gene has been stably integrated into genome. The expression "heterologous gene" essentially means a gene which is provided or assembled outside the plant and when introduced in the nuclear, chloroplastic or mitochondrial genome gives the transformed plant new or improved agronomic or other properties by expressing a protein or polypeptide of interest or by down-regulating or silencing other gene(s) which are present in the plant (using for example, antisense technology, cosuppression technology or RNA interference—RNAi—technology). A heterologous gene that is located in the genome is also called a transgene. A transgene that is defined by its particular location in the plant genome is called a transformation or transgenic event.

While agricultural fields are mentioned, it should be understood that the method disclosed herein may be applied to any agricultural area of interest upon which it is desired to apply an agrochemical. For instance, these may include areas upon which it is not desired to plant seeds and grow crops.

Object of Interest

As indicated herein, the remote sensing survey can be performed to study an object of interest. The object of interest can be any object that is desired to be investigated within or adjacent to the agricultural area of interest. In this regard, the object of interest may be present within and/or adjacent to an agricultural area of interest.

In one embodiment, the object of interest may be an insect, such as a pollinating insect. For instance, in one embodiment, the insect may be a bee. In general, bees are insects of the Order Hymenoptera, Superfamily Apoidea. The bees may be any kinds of bees generally known in the art.

In one embodiment, the bee is a honey bee (*Apis*). In one embodiment, the bee is a European honey bee (*Apis mellifera*) or Africanized honey bee. Examples of common bees are bumble bees (*Bomzbus*), small carpenter bees (*Ceratina*), large carpenter bees (*Xylocopa*), paper wasps (*Polistes*), yellow jackets (*Vespula*), and baldfaced hornets (*Vespula*). As used herein, the term "honey bee" can refer to any member of the Order Hymeoptera, Family Apidae, and includes, without limitation, *Apis andreniformis, Apis cerana, Apis dorsata, Apis florae, Apis mellifera, Apis koschevnikovi, Apis laboriosa, Apis nigrocincta, Apis rorea*, subspecies thereof, and strains, varieties, and hybrids thereof. In this regard, the object of interest may be bees, including honey bees and wild bees, such as bumble bees, as well as other types of bees. In one particular embodiment, the object of interest is a honey bee.

While certain bees are mentioned individually above, it should be understood that the method disclosed herein and the object of interest may be directed to any of the aforementioned bees, alone or in any combination.

As indicated above, the present invention refers to insects for simplicity of discussion, but it is to be understood that the present disclosure is not so limited. For instance, the remote sensing survey can be employed to study other types of insects as the objects of interest.

Agrochemicals

As indicated herein, agrochemicals may be any chemicals employed in the agricultural industry for a desired purpose. For instance, the agrochemical may be utilized depending on the desired objectives and the data generated from the remote sensing survey.

In general, the agrochemicals may include pesticides, fertilizers, insect repellant compounds/compositions, insect attractant compounds/compositions, etc. Thus, while certain agrochemicals are mentioned herein, it should be understood that the present invention is not limited to such.

In one embodiment, the agrochemical includes a pesticide. In general, pesticides are employed to destroy or inhibit pests. These pesticides may include any pesticides generally employed in the art. These pesticides can include, but are not limited to, herbicides, insecticides, fungicides, miticides, nematicides, etc. or any combination thereof.

In one embodiment, the agrochemical may be an herbicide compound or composition. It may be desired to employ such herbicides in order to prevent or destroy unwanted vegetation (e.g., weeds). It should be understood that any herbicide known in the art may be employed. These herbicides may include pre-plant herbicides, pre-emergence herbicides, and/or post-emergence herbicides.

In one embodiment, the agrochemical may be an insecticide. It may be desired to employ such insecticides in order to destroy or inhibit unwanted insects (e.g., ants). Examples of such insecticides are well known by those skilled in the art. It should be understood that any insecticide known in the art may be employed.

In one embodiment, the agrochemical may be a fungicide. It may be desired to employ such fungicides in order to destroy or inhibit unwanted fungi or fungal spores. Examples of such fungicides are well known by those skilled in the art. It should be understood that any fungicide known in the art may be employed.

In one embodiment, the agrochemical may be a miticide compound or composition. It may be desired to employ such miticides in order to destroy or inhibit unwanted mites. Examples of such miticides are well known by those skilled in the art. It should be understood that any miticide known in the art may be employed.

In one embodiment, the agrochemical may be a nematicide compound or composition. It may be desired to employ such nematicides in order to destroy or inhibit unwanted nematodes (e.g., roundworms). Examples of such nematicides are well known by those skilled in the art. It should be understood that any nematicide known in the art may be employed.

In one embodiment, the agrochemical may be a fertilizer. It may be desired to employ such fertilizers in order to provide nutrients for plant and/or crop growth. Examples of such fertilizers are well known by those skilled in the art. For instance, the fertilizers may include, but are not limited to, Urea, Ammonium Nitrate, Ammonium Sulfate, Calcium Nitrate, Diammonium Phosphate, Monoammonium phosphate, Triple Super Phosphate, Potassium Nitrate, Potassium nitrate, nitrate of potash, Potassium Chloride, muriate of potash, di and mono potassium salts of phosphite/phosphonate. However, it should be understood that any fertilizer known in the art may be employed.

In one embodiment, the pesticide may exhibit insecticidal and/or nematicidal properties. In another embodiment, the pesticide with insecticidal and/or nematicidal properties may be a neonicotinoid-based compound or composition. For instance, the neonicotinoid-based compound may be a clothianidin-based compound or composition. In another embodiment, the neonicotinoid-based compound may be an imidacloprid-based compound or composition. In one embodiment aspect, the neonicotinoid-based compound or composition, such as the clothianidin-based compound or composition, may be provided together with a *bacillus* compound or composition. For instance, the *bacillus* compound or composition may include a *Bacillus firmus* compound or composition.

The a compound or composition with insecticidal and/or nematicidal properties, such as the neonicotinoid-based compound or composition, may include one or more of Poncho®/VOTiVO™ (Bayer CropScience), Poncho® Beta (Bayer CropScience), Poncho® 600 (Bayer CropScience), Poncho® 1250+VOTiVO™ (Pioneer), Belay® (Valent), Prosper® FX (Bayer CropScience), or Prosper® Evergol. In one particular embodiment, the compound or composition with insecticidal and/or nematicidal properties comprises Poncho®/NOTiVO™ (Bayer CropScience). For instance, Poncho®/VOTiVO™ comprises, consists of, or consists essentially of clothianidin and *Bacillus firmus*.

According to one embodiment, it may be desirous to repel a specific object of interest, such as a bee, from an agricultural area of interest. In this regard, the agrochemical may be an insect repellant compound or composition. For instance, the compound or composition may repel some, all, or a broad range of insects, such as bees. In an embodiment, an insect repellant compound or composition described herein can control or alter the behavior of an insect, for example a pollinating insect, such as a bee.

For instance, it may be desirous to repel a specific object of interest away from the agricultural area of interest. For instance, it may be desirous to repel an object of interest, such as a bee, from an area of interest. For instance, when the bees are within an area of interest upon which it is desired to apply an agrochemical, it may be desired to apply the repellant compound or composition to such area so that the bees will move and the agrochemical can be applied to the area of interest.

Various compounds and compositions that may be employed according to the present disclosure are discussed in U.S. 2014/0271534, U.S. 2014/0274682, U.S. 2014/0274683, and U.S. 2014/0274684, all of which are incorporated herein by reference in their entirety. However, it should be understood that the present disclosure is not limited to only these compounds or compositions and that any compounds, any products (including commercial products), or compositions known to serve as a repellant, including broad-spectrum insect repellants or selective insect repellants such as selective bee repellants, may be employed according to the present disclosure.

In one embodiment, the insect repellant compound is represented by any one of the following formulae:

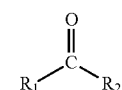 (I)

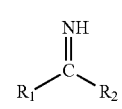 (II)

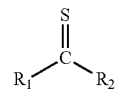 (III)

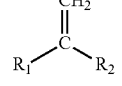 (IV)

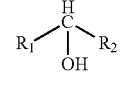 (V)

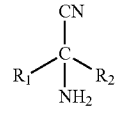 (VI)

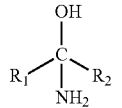 (VII)

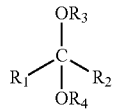 (VIII)

In one embodiment, $R_1$ and $R_2$ are independently selected from hydrogen, an alkyl, aryl, phenyl, substituted phenyl, fused phenyl, heterocyclic ring, aryl alkyl, vinyl, acetyl, vinyl alky, propargyl, and ally group and $R_3$ and $R_4$ are individually selected from H, alkyl, methyl, ethyl, propyl, or butyl. For instance, in another embodiment, $R_1$ and $R_2$ are independently selected from methyl, ethyl, propyl, isopropyl, cyclopropyl, butyl, iso-butyl, tert-butyl, pentyl, hexyl, heptyl, octyl, nonyl, decyl, undecyl and substituted or non-substituted $C_2$-$C_{14}$-alkyl, substituted or non-substituted $C_2$-$C_{14}$ alkenyl, a substituted or non-substituted $C_2$-$C_{14}$-alkynyl. In another embodiment, an alkyl group is a straight chain, branched, cyclic, cyclic alkyl optionally substituted with halogen, such as F, Cl, Br, I, oxygen, hydroxyl, alkoxy, cyano, aryloxy, C=C, C≡C; nitrogen, $NH_2$, alkyl amino, dialkyl amine trialkylamino; SH, alkylthio and oxidation states, arylthio and oxidation states; amido, monoalkylamino, dialkylamino, and ureide.

In yet another embodiment, $R_1$ and $R_2$ can form a ring, such as a cycloalkyl ring, for example, a cyclehexyl, cycloheptyl, cyclopentyl, cyclopropyl, cyclobutyl, cyclooctyl, fused alkyl ring, such as camphor. In another embodiment, the $R_1$ and $R_2$ ring is a phenyl ring optionally substituted with one or more of halogen, OH, alkoxy, cyano, amino alkylamino, dialkylamino, SH, alkylthio and oxidation states, pheoxy, formyl, alkylcarbonyl, alkoxycarbonyl, haloalkyl, haloalkoxy, polyhaloalkyl, polyhaloalkoxy, perlialoalkyl, perhaloalkoxy, amido, alkylamino, amino, dialkylarnino, hydroxycarbonyl, alkyl carbonyl, aryl carbonyl, and alkoxycarbonyl groups.

In yet another embodiment, the disclosure provides for one or more of an insect repellant compound or composition selected from the group consisting of pine oil, tea tree oil, essential oil of tea tree, densifolia leaf essential oil, essential oil of *ocimum santum*, systox, phenol, alkaloids, carum copticum oil, propionic anhydride, butyric anhydride, methyl salicylate, 6-hexatriacontene, stenpcereol, 27,28,29-trisnor-13-15-17-meratriene, samaderine E, phenylacetaldehyde, benzaldehyde, Swertia densifolia leaf essential oil, linalool, ambrette seed oil, cascarilla bark oil, leaf oil, cascarilla bark oil, rue oil, rue flower oil, terpineol, stearic acid, hydroquinone and octadecanal, methyl anthranilate, methyl anthranilate, creosote, acetic acid and propionic acid, N,N-diethyltoluamide, dimethyl phthalate, and isopropyl cinnamate. The disclosure also provides for one or more of an insect repellant compound or composition combinations selected from the group consisting of citronella (for example *Cymbopogon* spp, *Cymbopogon nardus, Cymbopogon winterianus and Cymbopogon citratus*), eucalyptus (*Eucalyptus* spp.), lemon eucalyptus (*Corymbia citriodora*), cinnamon (*Cinnamomum verum*), castor (*Ricinus communis*), rosemary (*Rosmarinus officinalis*), cedar (*Cedrus* spp.), peppermint (*Mentha piperita*), clove (*Syzygium aromaticum*), geranium (*Pelargonium graveolens*), verbena (*Verbena* spp., *Verbena officinalis*), pennyroyal (*Mentha pulegium*), lavender (*Lavandula* spp.), pine (*Pinus* spp.), cajeput (*Melaleuca* spp.; *Melaleuca leucadendra*), basil (*Ocimum basilicum*), thyme (*Thymus vulgaris*), pandan (*Pandanus amaryllifolius*), allspice (*Pimenta dioica*), soybean (*Glycine max*), garlic (*Allium sativum*), DEET, Picaridin, p-Mentane-3,8-diol, Permethrin, Allethrin, Metofluthrin, Geraniol, Eugenol, Cinnamaldehyde, Alkaloids, p-cymene, linalool, α-pinene, β-pinene, sabinene, myrcene, α-phellandrene, α-terpinene, α-terpineol (a component of tea tree oil and pine oil), α-ter, limonene, 1,8-cineole, γ-terpinene, terpinolene, terpinen-4-ol and α-terpineol, copticum, and Ptychotis oil.

In addition to the above, the agrochemical may further include camphor oil, ajowan oil, camphor powder, rosemary powder, rosemary oil, or a combination thereof. In one embodiment, this component may be combined with the insect repellant compound.

It should be understood any of the aforementioned insect repellant compounds and compositions may be used alone or in combination. For instance, by employing as a combination, a synergistic effect may be realized for repelling, controlling, and/or directing the insects, such as bees.

According to one embodiment, it may be desirous to attract a specific object of interest, such as a bee, to an area of interest. For instance, it may be desirous to attract a specific object of interest away from the agricultural area of interest to another area of interest. For instance, it may be desirous to attract an object of interest, such as a bee, to a beehive. For instance, when the bees are within an area of interest upon which it is desired to apply an agrochemical, it may be desired to apply the attractant compound or composition to another area of interest, such as a beehive, so that the bees will move and the agrochemical can be applied to the first area of interest.

In this regard, the agrochemical may be an insect attractant compound or composition. In general, the insect attractant compound or composition may be used to attract some, all, or a broad range of insects, such as bees. In an embodiment, an insect attractant compound or composition described herein can control or alter the behavior of an insect, for example a pollinating insect, such as a bee.

Any insect attractant compound or composition as employed in the art may be utilized according to the present invention. For instance, in one embodiment, the attractant may be a sugar. In particular, the attractant may be sucrose, fructose, glucose, etc. In one particular embodiment, the attractant may include sucrose.

It should be understood any of the aforementioned insect attractant compounds and compositions may be used alone or in combination. For instance, by employing as a combination, a synergistic effect may be realized for repelling, controlling, and/or directing the insects, such as bees.

In one embodiment, an insect repellant compound and an insect attractant compound may be used in combination. For instance, an insect repellant compound or composition may be used within an agricultural area of interest and an insect attractant compound or composition may be applied to another area of interest. For instance, if it is desired to apply an agrochemical within an agricultural area of interest and insects, such as bees, are present within such area, it may be desired to apply a repellant compound or composition to the agricultural area of interest to repel the insects, such as the bees, away from the area and also apply an insect attractant compound or composition to another area, such as an area adjacent or in proximity to the first area or even a beehive, in order to attract the insects, such as the bees, away from the first area and to the second area.

In general, the attractant and repellant compounds or compositions described herein work by, without intending to be limited by theory, influencing or altering the senses of an insect. For instance, the compound or composition alters the olfactory senses, sight, or other physical characteristics or combinations thereof of an insect. For example, where one compound or composition is an insect repellant or attractant compound or composition that operates on olfactory sense, another compound or composition may be included or may be applied before, after, or simultaneously with the first compound or composition, that operates on the senses. These may involve compounds or compositions that direct or repel or attract the insect based on sight (e.g., color), tactile sensations, taste, or other physical characteristics such as sound, vibrations, and combinations of any of the foregoing.

Remote Sensing

In general, remote sensing is the technique of obtaining information about an object of interest and/or an area of interest through the analysis of data collected by certain methods and instruments that are not in direct physical contact with the object of interest and/or the area of interest. In particular, the data can be gathered using sensors or other data collection devices. While the present disclosure references various methods of remote sensing, it should be understood that any method of remote sensing to obtain information about an object of interest and/or an area of interest may be employed.

According to one embodiment of the present disclosure, an agricultural area of interest may first be identified thereby allowing the data obtained to be correlated to such area of interest.

The method includes a step of performing a remote sensing survey within and/or adjacent to an agricultural area of interest. The survey generates remotely sensed data. In one embodiment, the remotely sensed data may include information that can be used to identify the object of interest. The remotely sensed data may also include information that can be used to identify the agricultural area of interest. For instance, in one embodiment, the data may provide latitude and longitude coordinates identifying the area of interest.

In one embodiment, the generated remotely sensed data can be gathered and/or transmitted. For instance, in one embodiment, the data can be gathered and/or transmitted upon completion of the remote sensing survey. In another embodiment, the data can be transmitted in real-time as it is generated during the remote sensing survey.

The remotely sensed data can be transmitted or sent to a recipient, such as, but not limited to, a person or object that can receive, analyze, and/or utilize such data. For instance, in one embodiment, the recipient may be an individual, such as a farmer, a crop manager, or any other individual capable of receiving, interpreting, and/or analyzing the remotely sensed data. The recipient may also be an electronic device, such as a database, a server, a computer, a web-based phone, a personal digital assistant, and/or any other device that is in communication with the device employed for performing the remote sensing survey.

In addition, the transmission may be conducted via a wireless communication. In this regard, the remotely sensed data can be transmitted without the need for general hard-wire connections. In another embodiment, the remotely sensed data can be transmitted via a wired communication. In another embodiment, the remotely sensed data may be transmitted via a combination of wired and wireless communications. The methods and equipment (e.g., hardware and software requirements, computer network configurations, database and/or server configurations, etc.) necessary for such wired and/or wireless communications can be employed as known by those of ordinary skill in the art.

Once transmitted, the remotely sensed data can be processed for analysis in order to obtain the desired information regarding the object of interest and/or the agricultural area of interest. If a specific object is being investigated within or adjacent to the agricultural area of interest, the remotely sensed data can be used to determine the activity of the object of interest.

The processing and/or analysis can be performed by the recipient of the remotely sensed data. For instance, in one embodiment, an individual may interpret and/or analyze the remotely sensed data generated by the remote sensing survey. In another embodiment, the remotely sensed data may be analyzed by software based upon any variety of algorithms and software modules.

Thereafter, based on the analysis of such remotely sensed data, a recommendation may be generated. For instance, the remotely sensed data may be used to determine whether to apply an agrochemical. This determination may be made based on an insect presence within and/or adjacent to the agricultural area of interest. In particular, the remotely sensed data may be used to determine the time and/or location for applying such agrochemical. In this regard, analysis of the remotely sensed data allows for the determination of the ideal time(s) and/or location(s) for conducting certain crop management processes and procedures, such as applying an agrochemical.

As an example, a remote sensing survey may be performed to investigate the activity of bees, whether located within and/or adjacent to the agricultural area of interest. In addition, the remote sensing survey may be performed on bees located within a beehive. In this regard, the beehive may be located within and/or adjacent to the agricultural area of interest.

The following scenarios provide examples regarding the aforementioned determination. If it is determined that the object of interest, such as a bee, is not present within the agricultural area of interest and it is desired to apply an agrochemical, such as a pesticide or a fertilizer, to such area, in one embodiment, it may be determined that an agrochemical can be applied at that time.

If it is determined that the object of interest, such as a bee, is present within the agricultural area of interest during the time of performing the remote sensing survey, in one embodiment, it may be determined that an agrochemical, such as a pesticide or a fertilizer, should not be applied to that area at that time. In addition, a subsequent survey may be performed to determine whether the objects of interest are still present within the area of interest. However, in another embodiment, it may be determined that an agrochemical, such as an insect repellent compound or composition, can be applied at that time to the area of interest to repel the insect. Alternatively or in addition, an insect attractant compound can be applied to another area of interest, such as a beehive if investigating bees, to attract the insects away from the first agricultural area of interest.

Similarly, as mentioned above, a remote sensing survey may be performed for investigating a bee within a beehive wherein the beehive may be located within or adjacent to the agricultural area of interest. Remotely sensed data, in this instance, can be used to assess the activity and/or development of the bee colony within the beehive. For instance, the data can be used to determine whether bees are present to a certain extent within the beehive or whether they are foraging. If the bees are present within the beehive and it is desired to apply an agrochemical, such as a pesticide or fertilizer, to the area of interest, in one embodiment, it can be determined that an agrochemical may be applied to the area of interest. Depending on the location, the beehive may be considered as being adjacent to OF within the agricultural area of interest.

If it is determined that the bees are foraging, it may be determined that an agrochemical, such as a pesticide or fertilizer, should not be applied to the area of interest at that time. In addition, it may be desired to perform a subsequent remote sensing survey to determine whether the bees have returned to the beehive and/or whether an agrochemical can be applied to the area of interest. However, in another embodiment, it may be determined that an agrochemical, such as an insect repellent compound or composition, can be applied at that time to the area of interest to repel the insect. Alternatively or in addition, an insect attractant compound can be applied to another area of interest, such as a beehive if investigating bees, to attract the insects away from the first agricultural area of interest.

Depending on the analysis of the remotely sensed data and the presence of the object of interest, various agrochemicals can be applied to the area of interest. For instance, when the object of interest, such as a bee, is present within the agricultural area of interest, it may be desired to apply an agrochemical, such as an insect repellant, to the area of interest. Alternatively or in addition, it may be desired to apply an agrochemical, such as an insect attractant, to an area adjacent the agricultural area of interest. However, when the object of interest, such as a bee, is not present within the agricultural area of interest, it may be desired to apply an agrochemical, such as a pesticide, herbicide, fungicide, etc., to the area of interest. In addition, if it is desired to apply an agrochemical to a certain agricultural area of interest and it is determined that bees are present within such area of interest, it may be desired to apply an attractant to a second agricultural area of interest and/or a beehive thereby attracting the bees to such area of interest.

Further, subsequent remote sensing surveys may be performed. In particular, a subsequent remote sensing survey may be performed on the same or different agricultural area of interest wherein remotely sensed data is gathered, transmitted, and/or analyzed and a subsequent determination is made regarding the presence of an object of interest and/or the application of an agrochemical to the area of interest.

In general, the agrochemical can be applied while the remote sensing survey is being performed and the remotely sensed data is being analyzed. As mentioned above, the data can be gathered, transmitted, and/or analyzed. In one embodiment, such steps can be conducted in real-time. Therefore, the recipient can make a determination in real-time as to whether to apply an agrochemical and/or what type of agrochemical should be applied (e.g., pesticide, herbicide, repellant, attractant, etc.). In another embodiment, an agrochemical can be applied after the remote sensing survey has been conducted. In an even further embodiment, an agrochemical can be applied during the remote sensing survey and after the remote sensing survey has been conducted.

The method by which the data is generated, transmitted, processed, and/or analyzed may be dependent upon the method of remote sensing employed. Although various methods of remote sensing are discussed below, any method of remote sensing known in the art can be employed for obtaining information about an object of interest and/or an agricultural area of interest can be employed according to the present disclosure.

In one embodiment, the remote sensing method may be conducted by employing an optical sensor. In general, optical detection of the object of interest, such as a bee, can be performed using any method generally known in the art. For instance, in one embodiment, the optical detection may be conducted as disclosed in the article entitled "Optical detection of honey bees by use of wing-beat modulation of scattered laser light for locating explosives and land mines" to Kevin S. Repasky et al. in Applied Optics, Vol. 45, No. 8, pages 1839-1843 as well as in U.S. Pat. No. 7,511,624 to Shaw et al., both of which are herein incorporated by reference in their entirety.

In general, optical detection can be used to detect the wingbeat of an insect, such as a bee, Different flying insects may have signature wingbeats in terms of frequency and/or harmonics, which can be used to identify the specific insect. While some insects may have similar wingbeat profiles, other information may also be used to identify the insect. For instance, this information may include, but is not limited to, insect seasonal activity, insect circadian rhythm, insect geographical distribution, etc.

In one embodiment, one method of optical detection can employ a temporal-frequency sensitive receiver to detect laser light that is scattered by an oscillating object. This method allows for remotely sensing the position and movement of a certain object, such as a bee. While not to be limited by theory, the use of optical detection and frequency-modulated signals resulting from light scattered from moving wings can allow for the discrimination between the return signal of the bee from that of vegetation and a cluttered background.

In general, a diode laser instrument can be employed for detecting the presence of an insect, such as a bee. A continuous-wave diode laser provides an output beam that illuminates a target and an illuminated bee's wings scatter light back to the instrument. The intensity modulation results from the wing motion. For instance, an illuminated bee's wings will scatter light back to the instrument with intensity modulation resulting from the wing motion.

For detecting and identifying the presence of particular flying insects, such as a bee and in particular a honey bee, the wing-beat frequency of various insects has been studied. In one embodiment, when studying honey bees, the modulated signal will be between 170 and 270 Hz, the characteristic wing-beat frequency of honey bees. For instance, the frequency may be from 180 to 240 Hz, such as from 185 to 230 Hz, such as from 190 to 220 Hz. In one embodiment, the frequency may be 200+/−10 Hz, such as 200+/−15 Hz, such as 200+/−30 Hz, such as 200+/−25 Hz. However, it should be understood that the frequency may vary depending on various factors such as age, size of the insect, and/or size of the wing of the insect as well as various environmental factors such as temperature and humidity.

In one embodiment, the optical sensor may comprise a light detection and ranging (lidar) device. The lidar device can include a pulsed laser transmitter, a receiver telescope, and a detector system. With a lidar device, a short pulse of laser light is transmitted through the air over an area of interest while some of the light that strikes an object of interest, such as a bee. As the pulse propagates, it encounters molecules, particles, objects, etc. which scatters the light. Some of the light is scattered back towards the lidar device and collected by the telescope collocated with the laser. The time between the outgoing laser pulse and the return signal can be used to measure the distance of the object of interest from the lidar device. This information can be used to produce a map of the location of the objects of interest, such as bees, and other objects that scatter light.

In some instances, however, it may be difficult to determine the specific object that caused the light to be scattered back to the receiver. In these instances, it may be advantageous to use the lidar device in combination with another remote sensing method in order to determine the presence of a desired object of interest.

In one embodiment, the optical sensor may comprise an accelerometer. In general, monitoring communication vibrations of bees can provide information regarding bee behavior. The accelerometer may be employed to detect and interpret the movement of bees thereby providing information regarding the colony behavior and organization. For instance, an optical sensor, such as an accelerometer, can be used to detect vibrations as well as the speed and direction of the specific vibration source by triangulating a specific signal or vibration. It is known that various types of vibrational communications exist (e.g., waggle dance, grooming signal, stop signal, etc.). The accelerometer may be positioned to collect information from within the hive or surrounding the hive, depending upon the specific signal or vibration that is being monitored. Monitoring these communications can provide an array of information regarding the location/position and abundance of a nectar source, forage efficiency, etc.

In one embodiment, the remote sensing method may be conducted by employing a visual sensor capable of creating images and/or videos of the agricultural area of interest. For instance, these sensors may include cameras coupled to a device, such as an earth-orbiting satellite or an aircraft, such as a drone. These sensors can create and produce information, such as images and/or videos, for processing and analysis. For instance, an aircraft can be navigated within and/or adjacent to the agricultural area of interest to obtain an airborne survey.

In one embodiment, the remote sensing method may be conducted by employing an acoustic sensor. For instance, an acoustic sensor can be employed to monitor and interpret the sound of a bee colony to assess the colony behavior, strength, and health. The acoustic monitoring may be performed as disclosed in GB 2489435, which is incorporated herein by reference in its entirety.

In one embodiment, an acoustic sensor may be employed within a beehive in order to obtain information regarding the hive acoustics and hive activity. For instance, an audio frequency transducer can generate an audio frequency signal from detected audio and vibrational activity. The signal can then be transformed into frequency representations. This transforming step may require a fast Fourier transform. When frequency representations are obtained on a regular basis, a frequency analysis can be conducted by comparing measurements to detect the presence of any unusual frequencies. In this regard, these representations can be processed to provide information regarding the colony, such as to detect when swarming is about to occur or when the bees are present within the beehive.

In this regard, these acoustic sensors can provide information regarding the hive activity and determine whether the bees are foraging. In addition, other monitoring devices may be employed within the beehive. These devices can be employed to provide information regarding hive temperature, brood temperature, humidity, hive weight, hive acoustics (e.g., flight noise, fanning noise, etc.), etc. While any acoustic sensor in the art may be employed for detecting hive acoustics, one example of a suitable acoustic sensor is that provided by Arnie.

In one embodiment, the remote sensing method may be conducted using a temperature sensor. For instance, temperature sensors can provide information regarding a brood nest. In particular, the information can be utilized for mapping the size and shape of the brood nest. In particular, the information can be utilized in developing a three-dimensional brood map. This information may be used to monitor and assess the size of a brood cluster as well as the development of a specific colony.

It should be understood that any combination of remote sensing techniques may be employed. For instance, an optical sensor can be employed to study an agricultural area of interest while an acoustic sensor can also be used to study activity within a beehive located within or adjacent to the agricultural area of interest. In this regard, performing a combination of remote sensing surveys based on various methods may provide more accurate results as to the presence of an insect, such as a bee, within or adjacent to the agricultural area of interest.

When employing a sensor within and/or adjacent to a beehive, it may be employed in a manner that allows for monitoring and/or obtaining the desired information. In one embodiment, the sensor may be employed to gather data pertaining to a beehive, whether a natural or an artificial beehive. In this regard, the sensor may be employed within or adjacent to such a beehive. In one embodiment, the sensor may be embedded into a honeycomb. For instance, a temperature probe and/or an accelerometer may be embedded into a honeycomb. Without being limited by theory, providing a sensor in such a manner may allow for more sensors to be added to a hive. However, it should be understood that the positioning of a sensor is not limited to a honeycomb. As indicated, it may be positioned in any manner that allows for monitoring and/or obtaining the desired information. Preferably, the sensor is positioned also so as to be minimally intrusive or even non-intrusive.

The present inventors have discovered that the remote sensing methods disclosed herein increase the efficiencies of the crop management process. For instance, by obtaining the aforementioned information, the method can provide timely and accurate data regarding an object of interest and/or an agricultural area of interest. This data can then be used to make a determination as to whether to apply an agrochemical to the area of interest.

Methods of Repelling, Attracting, Controlling, or Directing an Insect

The present disclosure also provides for a method of (i) repelling, controlling, and/or directing an insect utilizing the aforementioned insect repellant and/or insect attractant compounds and/or compositions. The method may also comprise (i) repelling, controlling, and/or directing an insect comprising treating a seed, plant part, or plant with any of the aforementioned agrochemicals.

In an embodiment, the disclosure provides for a method of selectively repelling, attracting, controlling, or directing a pollinating insect, for example a bee. This may be conducted with an insect repellant compound or composition or an insect attractant compound or composition as described herein. Thereafter, another agrochemical may be applied to a particular area of interest as desired.

In another embodiment, a compound or composition described herein repels, attracts, controls, or directs on a selective basis. In yet another embodiment, the insect may be directed by coming into contact with a compound or composition described herein. In another embodiment, an insect of interest, such as a bee, in a manner such that the insect is not in direct contact with a substance treated with the insect repellant and/or attractant compound or composition. In another embodiment, a compound or composition described herein repels, attracts, controls, or directs an insect of interest, such as a bee, in a manner such that the insect has only minimal contact with a treated substance.

In another embodiment, the disclosure provides for a method of repelling, attracting, controlling, or directing an insect, for example a bee, away from a an agrochemical area of interest. In another embodiment, the disclosure provides for a method of repelling, controlling, or directing an insect, for example a bee, away from a seed, plant part, or plant or an agrochemical area of interest. The former may be conducted using a repellant compound while the latter may be conducted using an attractant compound.

In yet another embodiment, the disclosure provides for a method of repelling, controlling, or directing an insect from an area or substance while at the same time attracting an insect to a different area or substance. The disclosure provides for a method of treating an area or substance with a repelling, controlling, or directing compound or composition described herein and at the same or different time treating a distinct area or substance with an insect attractant compound that is strategically placed at an optimized distance. In an embodiment, such a methodology can help to increase repelling, controlling, or directing efficacy by repelling an insect from an area to be avoided while attracting the same insect to an area of interest.

In an embodiment, an insect repellant and/or attractant compound or composition described herein repels, attracts, controls, and/or directs an insect of interest such that the insect is not in direct contact with a seed, plant part, plant, area, or other substance treated with a compound or composition described herein.

In another embodiment, an insect repellant compound or composition described herein repels, controls, or directs an insect of interest such that the insect is not in direct contact with a treated substance or area of interest for at least about 10 minutes, about 30 minutes, about 1 hour, about 4 hours, about 8 hours, about 12 hours, about 24 hours, about 2 days, about 3 days, about 7 days, about 14 days, about 21 days, about 1 month, about 2 months, or about 3 months or more.

In yet another embodiment, an insect repellant compound or composition described herein repels, controls, or directs an insect of interest such that the insect is not in direct contact with a treated substance for a desired or designated period of time, for example, a planting or growing season.

In another embodiment, an insect repellant compound or composition described herein repels, controls, or directs an insect of interest such that the insect is at least about 1 cm, at least about 5 cm, at least about 10 cm, at least about 100 cm, at least about 0.2 m, at least about 0.5 m, at least about 1 m, at least about 2 m, at least about 5 m, at least about 10 m, at least about 25 m, at least about 50 m, at least about 100 m, at least about 200 m, or at least about 300 m or more away from a seed, plant part, plant, area, or other substance treated with an insect repellant compound or composition or area of interest treated as described herein.

In another embodiment, an insect repellant compound or composition described herein repels, controls, or directs an insect of interest such that the insect is at least about 1 cm to about 10 cm, about 10 cm to about 100 cm, about 100 cm to about 500 cm, about 1 m to about 5 m, about 5 m to about 10 m, about 10 m to about 50 m, about 50 m to about 100 m, about 100 m to about 250 m, and about 250 m to about 500 m or more away from a seed, plant part, plant, area, or other substance treated with a compound or composition or area of interested treated as described herein.

In another embodiment, an insect repellant compound or composition described herein controls or directs an insect of interest, such as a bee, for at least about 10 minutes, about 30 minutes, about 1 hour, about 4 hours, about 8 hours, about 12 hours, about 24 hours, about 2 days, about 3 days, about 7 days, about 14 days, about 21 days, about 1 month, about 2 months, about 3 months or more, or designated planting or growing season.

In another embodiment, one or more insect repellant compounds or compositions can be added in a manner that modifies or increases repellency. A compound or composition described herein can also be formulated in a delayed release formulation or controlled release formulation which can delay or control the release of the repelling compound or composition. In another embodiment, a compound or composition described herein can also be formulated in a rapid release formulation which can expedite the release of the insect repellant compound or composition.

In another embodiment, one or more insect attractant compounds or compositions can be added in a manner that modifies or increases attractancy. A compound or composition described herein can also be formulated in a delayed release formulation or controlled release formulation which can delay or control the release of the attracting compound or composition. In another embodiment, a compound or composition described herein can also be formulated in a rapid release formulation which can expedite the release of the insect attractant compound or composition.

In an embodiment, a method of "repelling" refers to the ability of a compound or composition described herein to influence or alter the behavior of an insect, for example, a bee, away from an area, location, structure, seed, plant, plant part, or substance of interest. In order to be classified as "repelling" according to an embodiment of the disclosure, it is not necessary that 100% of the insects, such as pollinating insects, be directed away from an area, location, structure, seed, plant, or substance of interest. In yet another embodiment, an insect is "repelled" if at least 50%, at least 75%, at least 90%, at least 95%, or at least 98% of the insects are directed away from an area, location, structure, seed, plant, plant part, or substance of interest.

In an embodiment, a method of "attracting" refers to the ability of a compound or composition described herein to influence or alter the behavior of an insect, for example, a bee, away from an area, location, structure, seed, plant, plant part, or substance of interest and to another area, location, structure, seed, plant, plant part, or substance of interest. In order to be classified as "attracting" according to an embodiment of the disclosure, it is not necessary that 100% of the insects, such as pollinating insects, be directed away from an area, location, structure, seed, plant, or substance of interest and to another area, location, structure, or substance of interest. In yet another embodiment, an insect is "attracted" if at least 50%, at least 75%, at least 90%, at least 95%, or at least 98% of the insects are directed away from an area, location, structure, seed, plant, plant part, or substance of interest and to another area, location, structure, or substance of interest.

In another embodiment, a method of "directing" refers to the ability of a compound or composition described herein to influence the behavior or movement of an insect, for example a bee, in a given direction. In order to be classified as "directing" according to an embodiment of the disclosure, it is not necessary that 100% of the insects, pests, or other animals be directed away from an area, location, structure, seed, plant, plant part, or substance of interest. In yet another embodiment, an insect is "directed away" if at least 50%, at least 75%, at least 90%, at least 95%, or at least 98% of the insects are directed away from an area, location, structure, seed, plant, or substance of interest.

In an embodiment, a method of "controlling" refers to the ability of a compound or composition described herein to control or alter the behavior of an insect, for example a bee. In order to be classified as "controlling" according to an embodiment of the disclosure, it is not necessary that 100% of the insects, pests, or other animals be controlled away from an area, location, structure, seed, plant, plant part, or substance of interest. In yet another embodiment, an insect is "controlled" if at least 50%, at least 90%, at least 95%, or at least 98% of the insect behavior is altered or controlled relative to an area, location, structure, seed, plant, plant part, or substance of interest.

Application of Agrochemical

In an embodiment, the agrochemical can be applied in a in a single application step. In another embodiment, the agrochemical can be applied in multiple application steps, for example, two, three, four, five or more application steps. In another embodiment, the second, third, fourth, or fifth or more application steps may be with the same or different agrochemicals. The methods described herein also provide for an embodiment where multiple application steps are excluded.

In one embodiment, the agrochemical is applied to an agricultural area of interest and in particular can be applied to a plant, crop, seed, or plant part thereof at the time of planting to about 30 minutes, about 30 minutes to about 1 hour, about 1 hour to about 4 hours, about 4 hours to about 12 hours, about 1 hour to about 1 day, about 1 day to about 5 days, about 5 days to about 10 days, about 10 days to about 20 days, about 15 days to about 30 days, about 30 to about 100 days, or any combination thereof. In yet another embodiment, an agrochemical as described herein is applied to an area of interest and in particular can be applied to a plant, crop, seed, or plant part thereof in one or more application intervals of about 30 minutes, about 1 hour, about 2 hours, about 6 hours, about 8 hours, about 12 hours, about 1 day, about 5 days, about 7 days, about 10 days, about 12 days, about 14 days, about 21 days, or about 28 days.

In one embodiment, the agrochemicals can be applied one or more times during a growing, planting, or harvesting season. In another embodiment, the agrochemical can be applied one, two, three, four, or five or more times during a growing, planting, or harvesting season. In another embodiment, an agrochemical described herein is applied only one time, no more than two times, or no more than three times during a growing, planting, or harvesting season.

In yet another embodiment, an agrochemical is applied prior to planting, at planting, after planting or combinations thereof. In another embodiment, an agrochemical is applied prior to or during the period when an insect described herein is likely to be foraging or harvesting nectar or pollen from a flower or plant.

In an embodiment, an agrochemical may be applied to a seed during the planting process. In yet another embodiment, an agrochemical is applied in an in furrow process. In another embodiment, an agrochemical as described herein can be applied during bloom, for example, in orchards. In an embodiment, the agrochemical may be applied to any combination thereof.

In another embodiment, an agrochemical as described herein is applied in an application regimen at about 1 hour to about 3 hours after the first application and followed by a second application at about 3 hours to about 6 hours; at about 1 hour to about 3 hours after the first application and followed by a second, third, or fourth application at about 12 hours to about 24 hours about 1 to about 7 days after the first application and followed by a second application at about 10 to about 14 days. In yet another embodiment, an agrochemical as described herein is applied to a seed prior to planting and a foliar application is made at about 1 day to about 5 days, about 5 days to about 10 days, about 10 days to about 20 days, about 20 days to about 50 days, about 40 days to about 60 days, or about 20 days, about 30 days, about 40 days, about 45 days, about 50 days, or any combination thereof, after planting.

In another embodiment, the disclosure provides for pre-plant, pre-emergent, post-emergent, application steps or combinations thereof. In another embodiment, an agrochemical as described herein is first applied in a pre-plant step and followed by one or more pre-emergent or post-emergent steps. In yet another embodiment, the disclosure provides for only a pre-plant step.

In another embodiment, an agrochemical as described herein is applied during the daytime hours. In another embodiment an agrochemical as described herein is not applied to a structure plant, crop, seed, or plant part thereof at night. In yet another embodiment, the application of an agrochemical as described herein is optimized based on when an insect, for example a bee, would most likely forage on a plant or crop. In another embodiment, an agrochemical as described herein can be applied during non-planting timing.

As used herein, plant parts should be understood as meaning all above ground and subsoil parts and organs of plants, such as shoot, leaf, flower, root, leaves, needles, stalks, stems, fruiting bodies, fruits and seeds, tubers and rhizomes. Plant parts also include harvested crops, and also vegetative and generative propagation material, for example cuttings, tubers, rhizomes, slips and seeds.

Seeds, plant parts, and plants may be treated with the described agrochemicals by applying directly to the seed, plant part, or plant. In another embodiment, the seed, plant part, or plant may be treated indirectly, for example by treating the environment or habitat in which the seed, plant part, or plant is exposed to. Conventional treatment methods may be used to treat the environment or habitat including dipping, spraying, fumigating, chemigating, fogging, scattering, brushing on, shanking or injecting.

In an embodiment, an insect repellant and/or attractant compound or composition described herein is capable of repelling, attracting, controlling, and/or directing an insect, for example a bee, described herein for at least about 30 minutes, about 1 hour, about 2 hours, about 3 hours, about 4 hours, about 5 hours, about 8 hours, about 10 hours, about 15 hours, about 20 hours, 24 hours, 48 hours, 72 hours, 7 days, two weeks, one month, two months, three months or more. In an embodiment, an insect repellant and/or attractant compound or composition disclosed herein may reduce (if repelling) or increase (if attracting) insect interaction with a mammal, pest, predator, plant, structure, and/or location for the aforementioned time periods or a growing, planting, or harvesting season.

In another embodiment, an insect repellant and/or attractant compound or composition described herein is capable of repelling, attracting, controlling, and/or directing an insect during a complete or partial growing, planting, or harvesting season.

In yet another embodiment, an insect repellant and/or attractant compound or composition described herein repels, attracts, controls, and/or directs an insect in an amount of at least 10%, such as at least 20%, such as at least 30%, such as at least 40%, such as at least 50%, such as at least 60%, such as at least 70%, such as at least 80% to less than or equal to 100%, such as less than or equal to 90%, such as less than or equal to 80%, such as less than or equal to 70%, relative to a compound or composition that does not contain an effective amount of such compound or composition as described herein.

Insects to Repel, Control, or Direct

In another embodiment, a compound or composition described herein selectively repels, attracts, directs, controls, and/or alters the behavior of one type or subset of insects, for example a bee, while not affecting other insects. For instance, in one embodiment, a repelling, attracting, controlling, and/or directing compound or composition is associated with an insecticidal composition, for example, by a combination of the repelling, attracting, controlling, and/or directing compound or composition together with an insecticidal composition. In another embodiment, a repelling, attracting, controlling, and/or directing compound or composition is sequentially applied at the same time, prior to, or after an insecticidal composition to, for example, an area, seed, plant part, or plant.

As a non-limiting example, (1) 2-decanone as the insect repellant compound is used to treat a field or yard, (2) clothianidin as the insecticidal compound, and (3) sucrose as the attractant compound or composition are used to treat a field or yard. As an example, all or a first portion of a field or yard is treated with (1) 2-decanone and (2) clothianidin, while the remaining section of the field or yard or a second or more portion of a field or yard is treated with an attractant compound or composition, such as (3) sucrose. Under such a scenario, an insect that is targeted for repelling, controlling, or directing, such as a honey bee, would be selectively repelled, controlled, or directed by the repelling, controlling, or directing compound, in this case the (1) 2-decanone and (2) clothianidin composition/combination, while being simultaneously attracted or drawn to the attractant compound or composition, in this case (3) sucrose. Such a procedure would allow for the selective repulsion or control of an insect of interest, for example a honey bee, while at the same time allowing for the insecticide, in this case clothianidin, to treat any unwanted insects or pests. As such, the honey bee would be selectively repelled, controlled, or directed away from the (1) 2-decanone and (2) clothianidin composition/combination, drawn to the (3) sucrose, while the infestation of any remaining insects or pests is addressed.

As another non-limiting example, compounds, compositions, and methods described herein can be utilized in the following scenario.

For example, in one embodiment of the present disclosure, a vacuum planter is used to plant corn seed in a large field in a typical farming operation. The corn seed is genetically modified to tolerate a glufosinate-based herbicide, and the corn seed is coated with a clothianidin/*Bacillus firmus* seed treatment (e.g. the PONCHO/VOTIVO seed treatment available from Bayer CropScience LP.) A lubricant and an insect controlling, directing and repelling composition of the Formulas I-IX, (for example 2 decanone in particular), that selectively repels honey bees is provided in a powder form as a separate composition to be incorporated, e.g., via scooping it into the seed hopper. In an optional embodiment of the present invention, the corn seeds are also coated with an insect controlling, directing and repelling compound at or about the time they are treated with the PONCHO/VOTIVO seed treatment. Also, in an optional embodiment of the present invention, the exhaust mechanism of the vacuum planter is fitted with a mechanism that allows for dispersion of the insect controlling, directing and repelling composition into the vacuum planter's exhaust at a variable rate that is selectable by the operator of the vacuum planter. Also, optionally in this embodiment of the present invention, an adjoining field containing wild flowers is treated with an attractant that operates to attract honey bees to the adjoining field.

When these embodiments of the disclosure are employed, including those that are optional, several benefits are apparent. As a starting point, dusting is reduced or eliminated with the lubricant. To the extent any dusting is not eliminated and develops from the corn seeds abrading against each other during planting, with the repellent composition present on the seeds, it will be abraded to and will be included in any dust that is formed and exhausted from the planter. And should more repellent composition be required or desired, the operator of the planter will selectively introduce additional repellent composition into the exhaust stream when and where it is needed.

The result is that honey bees are selectively repelled from the field where planting occurs, and are simultaneously drawn by the attractant to the neighboring field containing the wild flowers. Because the repellant composition is selective for honey bees, the PONCHO/VOTIVO seed treatment, as just one example of a seed treatment, remains effective to control other insects in the manner described on its label instructions.

Compositions

In an embodiment, the amount of an insect repellant and/or attractant compound or composition described herein can be an amount that is effective ("effective amount") to repel, attract, control, and/or direct the movement of an insect of interest. In another embodiment, the amount of a pesticidal compound or composition or fertilizer can be an amount that is effective to protect seeds, plant parts, or plants against infestation and provide adequate nutrients for growth, respectively.

In an embodiment, the percent of the repellant and/or attractant compound on any composition or formulation is determined by the interplay of the effectiveness in the compound, the medium or other components in which the compound is carried, the methods of application and the area that is being treated, when in terms of surface area or volume. For example, where the surface is a flat plate or wall, surface area may be used, and where the area is a room or other space, volume may be used to determine rates of applications.

In another embodiment, an agrochemical composition comprises an insect repellant or insect attractant compound or composition in at least about 0.01%, at least about 0.025%, at least about 0.05%, at least about 0.1%, at least about 0.25%, at least about 0.5%, at least about 1%, at least about 2% at least about 2.5%, at least about 5%, at least about 7.5%, at least about 10%, at least about 25%, or at least about 50%, by weight of a composition. In yet another embodiment, an agrochemical composition comprises an insect repellant or insect attractant compound or composition no more than about 0.01%, no more than about 0.025%, no more than about 0.05%, no more than about 0.1%, no more than about 0.25%, no more than about 0.5%, no more than about 1%, no more than about 2.0%, no more than about 2.5%, no more than about 5%, no more than about 7.5%, no more than about 10%, no more than about 25%, no more than about 50%, by weight of a composition.

In another embodiment, an agrochemical composition comprises an insect repellant or insect attractant compound or composition at 0.001% to about 0.1%, about 0.025%, about 0.0025% to about 0.25%, about 0.1% to about 1%, about 0.1% to about 2.5%, about 0.5% to about 2.5%, about 1% to about 2%, about 1% to about 3%, about 1% to about 5%, about 1% to about 10%, about 2% to about 10%, about 5% to about 10%, about 5% to about 20%, about 10% to about 25%, about 10% to about 50%, about 25% to about 50%, or about 20% to about 80%, and about 95% or more by weight of a composition.

In another embodiment an agrochemical composition described herein comprises a pesticidal compound in at least about 0.01%, at least about 0.025%, at least about 0.05%, at least about 0.1%, at least about 0.25%, at least about 0.5%, at least about 1%, at least about 2% at least about 2.5%, at least about 5%, at least about 7.5%, at least about 10%, at least about 25%, at least about 40% or at least about 50%, by weight of a composition.

In yet another embodiment, an agrochemical composition described herein comprises a pesticidal compound or composition with insecticidal and/or nematicidal properties described herein at 0.001% to about 0.1%, about 0.025%, about 0.0025% to about 0.25%, about 0.1% to about 1%, about 0.1% to about 2.5%, about 0.5% to about 2.5%, about 1% to about 2%, about 1% to about 3%, about 1% to about 5%, about 1% to about 10%, about 2% to about 10%, about 5% to about 10%, about 5% to about 20%, about 10% to about 25%, about 10% to about 50%, about 25% to about 50%, or about 20% to about 80%, and about 95% or more by weight of a composition.

It should be understood that the use of any pesticides as disclosed herein should be in accordance with any guidelines and instructions as provided on the approved labels.

In an embodiment, an agrochemical compound or composition described herein is formulated as a foliar composition, a foliar spray, solution, emulsion, coating formulation, non-pesticidal or pesticidal coating formulation, encapsulated formulation, solid, liquid, fertilizer, paste, granule, powder, suspension, or suspension concentrate. In another embodiment, an agrochemical compound or composition described herein may be employed alone or in solid, dispersant, or liquid formulation. In yet another embodiment, an agrochemical compound or composition described herein is formulated as a tank-mix product.

In another embodiment, an agrochemical compound or composition described herein can take any of a variety of dosage forms including, without limitation, suspension concentrates, aerosols, capsule suspensions, cold-fogging concentrates, warm-fogging concentrates, encapsulated granules, fine granules, flowable concentrates for the treatment of seed, ready-to-use solutions, dustable powders, emulsifiable concentrates, oil-in-water emulsions, water-in-oil emulsions, macrogranules, microgranules, oil-dispersible powders, oil-miscible flowable concentrates, oil-miscible liquids, foams, pastes, pesticide-coated seed, suspoemulsion concentrates, soluble concentrates, wettable powders, soluble powders, dusts and granules, water-soluble granules or tablets, water-soluble powders for the treatment of seed, wettable powders, natural products and synthetic substances impregnated with a compound or composition described herein, a net impregnated with a compound or composition described herein, and also microencapsulations in polymeric substances and in coating materials for seed, and also ULV cold-fogging and warm-fogging formulations. In another embodiment, a seed is coated, encapsulated or otherwise covered with one or more repelling, controlling, or directing compounds or compositions described herein.

In an embodiment, when applying the agrochemical, other additional components may be employed that provide an additional beneficial or otherwise useful effect. Such components include, without limitation, an adhesive, a surfactant, a solvent, a wetting agent, an emulsifying agent, a carrier, an adjuvant, a diluent, a dispersing agent, or any combination thereof. However, it should be understood that other components may also be employed.

In another embodiment, a compound or composition described herein can be formulated in a controlled-release, extended-release, rapid-release formulation or combinations thereof. In another embodiment, a compound or composition described herein can be formulated in a multi-coating or multi-layer formulation. The disclosure also provides for a formulation designed to release a compound or composition disclosed herein over a period of about 5 minutes, about 15 minutes, about 30 minutes, about 1 hour, about 2 hours, about 6 hours, about 12 hours, about 24 hours, about 3 days, about 5 days, about 7 days, about 15 days, about 30 days, about 45 days, about 60 days, about 75 days, or about 90 days in single or multiple release time points.

In an embodiment, a rapid-release layer or coating releases a compound immediately, after about 1 minute, after about 5 minutes, after about 15 minutes, after about 30 minutes, after about 1 hour, or after about 2 hours. In another embodiment, a controlled release layer or coating releases a compound after about 3 hours, after about 6 hours, after about 12 hours, or after about 18 hours. In another embodiment, an extended release or delayed-release layer or coating releases a compound after about 1 day, after about 2 days, after about 3 days, after about 7 days, or after about 14 days or more.

In another embodiment, an insect repellant compound or composition disclosed herein can be incorporated into a controlled-release device which dispenses a repelling, controlling, or directing compound and/or other beneficial compound over time in a regulated or predictable manner. A controlled-release device disclosed herein may be employed by itself or incorporated into another device used to house the controlled-release device.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part.

Furthermore, those of ordinary skill in the art will appreciate that the foregoing description is by way of example only, and is not intended to limit the invention so further described in such appended claims.

The invention claimed is:

1. A method for applying an agrochemical to an agricultural area of interest, the method comprising
performing a remote sensing survey within or adjacent to an agricultural area of interest wherein the remote sensing survey generates remotely sensed data;
analyzing the remotely sensed data to determine whether to apply an agrochemical based on presence of an insect or animal within or adjacent to the agricultural area of interest; and
applying the agrochemical in the area adjacent to the agricultural area of interest, wherein the agrochemical comprises an attractant compound or composition.

2. The method of claim 1, wherein the insect comprises a bee and wherein the step of analyzing the remotely sensed data is conducted to determine whether the bees are foraging the agricultural area of interest, and wherein a determination to apply the agrochemical is based on the determination that the bees are foraging the agricultural area of interest.

3. The method of claim 1, wherein the insect comprises a bee, wherein the remote sensing survey is performed on bees in a beehive located within or adjacent to the agricultural area of interest, and wherein a determination to apply the agrochemical is based on the remote sensing survey performed on the bees in the beehive.

4. The method of claim 1, wherein the step of performing a remote sensing survey is conducted with an optical sensor.

5. The method of claim 4, wherein the optical sensor detects a wingbeat, and wherein a determination to apply the agrochemical is based on the detected wingbeat.

6. The method of claim 1, wherein the step of performing a remote sensing survey is conducted with an acoustic sensor.

7. The method of claim 6, wherein the acoustic sensor detects hive acoustics, and wherein a determination to apply the agrochemical is based on the detected hive acoustics.

8. The method of claim 1, wherein the step of performing a remote sensing survey is conducted with a visual sensor.

9. The method of claim 1, wherein the step of performing a remote sensing survey is conducted with a temperature sensor.

10. The method of claim 1, wherein the agrochemical comprises an herbicide, an insecticide, a fungicide, a miticide, a nematicide, or any combination thereof.

11. A remote sensing system comprising:
a remote sensing device configured to generate remotely sensed data as part of a remote sensing survey within or adjacent to an agricultural area of interest; and
a processor configured to:
analyze the remotely sensed data to determine whether to apply an agrochemical based on presence of an insect or animal within or adjacent to the agricultural area of interest; and
apply the agrochemical in the area adjacent to the agricultural area of interest, wherein the agrochemical comprises an attractant compound or composition.

12. The remote sensing system of claim 11, wherein the remote sensing device comprises an optical sensor.

13. The remote sensing system of claim 11, wherein the remote sensing device comprises an acoustic sensor.

14. The remote sensing system of claim 11, wherein the remote sensing device comprises a visual sensor.

15. The remote sensing system of claim 11, wherein the remote sensing device comprises a temperature sensor.

* * * * *